(12) United States Patent
Katayama et al.

(10) Patent No.: US 8,048,499 B2
(45) Date of Patent: Nov. 1, 2011

(54) AUTOMOTIVE EXTERIOR RESIN PART

(75) Inventors: Masahiro Katayama, Tokyo (JP); Yuichi Oe, Tokyo (JP); Hideaki Sakamoto, Tokyo (JP); Hiroyuki Nakagawa, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 926 days.

(21) Appl. No.: 12/071,276

(22) Filed: Feb. 19, 2008

(65) Prior Publication Data

US 2008/0206538 A1 Aug. 28, 2008

(30) Foreign Application Priority Data

Feb. 23, 2007 (JP) ................. 2007-043052

(51) Int. Cl.
*B32B 1/00* (2006.01)
*B32B 1/08* (2006.01)
*B29D 22/00* (2006.01)
*B29D 23/00* (2006.01)

(52) U.S. Cl. ............... 428/34.5; 428/34.6; 428/34.7; 428/36.4; 428/36.8; 428/36.92

(58) Field of Classification Search ............... 428/34.1, 428/34.4–34.7, 35.7, 36.4, 36.8–36.92
See application file for complete search history.

(56) References Cited

U.S. PATENT DOCUMENTS 7,732,520 B2 * 6/2010 Onizawa et al. ............... 524/449

FOREIGN PATENT DOCUMENTS

JP 2002-226703 8/2002
JP 2006-082275 3/2006

* cited by examiner

*Primary Examiner* — Walter B Aughenbaugh
(74) *Attorney, Agent, or Firm* — Posz Law Group, PLC

(57) ABSTRACT

An automotive exterior resin part which is a molded article made of a long glass fiber reinforced polycarbonate resin/styrene-based resin, has been molded by injection molding, has a projected area of 200 cm$^2$ or above and allows coating, plating or deposition, wherein the content of the glass fibers in the molded article is 25 to 50% by weight and the weight-average fiber length thereof is 1.0 to 1.5 mm, the centerline average surface roughnesses (Ra) over all faces to be subjected to coating, plating or deposition is 0.8 μm or below and the maximum coefficient of linear expansion at 30 to 80° C. is $5\times10^{-5}$ (1/K) or below.

9 Claims, 1 Drawing Sheet

AUTOMOTIVE EXTERIOR RESIN PART

BACKGROUND OF THE INVENTION

1. Field of the Invention

This invention relates to an automotive exterior resin part which is excellent in dimensional stability, coating properties, etc.

2. Related Art

In automotive exterior parts, it has been a practice to employ a structure wherein an exterior metal panel is attached to a structural metal part. In recent years, however, various lighter automotive parts are preferred to improve, for example, fuel efficiency and traveling performance of automobiles. Under these circumstances, there is a tendency toward the use of resins in exterior panels and structures supporting the same.

It is required that an automotive exterior resin part, which has a relatively large size, has a high dimensional stability (a low warpage), a high mechanical strength, a high heat resistance, a high impact resistance, a low specific gravity, an excellent surface appearance, etc.

In automotive exterior resin parts, there has been proposed to use a carbon fiber reinforced polyamide composition (JP-A-2002-226703) and a fiber-reinforced polyester resin composition comprising, for example, polybutylene terephthalate (JP-A-2006-82275) and attempts have been made to satisfy the requirements as described above by controlling the amount or length of the fibers to be added. However, no sufficient effect has been established so far.

SUMMARY OF THE INVENTION

An object of the invention is to provide an automotive exterior resin part which has a high dimensional stability (a low warpage), a high mechanical strength, a high heat resistance, a high impact resistance, a low specific gravity, an excellent surface appearance, etc.

To achieve the above object, the present inventors have conducted intensive studies. As a result, they have found out that an automotive exterior resin part having such excellent characteristics as described above can be obtained by selecting an alloy of a polycarbonate resin with a styrene-based resin as the resin and controlling the content and weight-average fiber length of glass fibers in a molded article, thereby completing the invention.

Accordingly, this invention relates to an automotive exterior resin part which is a molded article made of a long glass fiber reinforced polycarbonate resin/styrene-based resin, has been molded by injection molding, has a projected area of 200 cm$^2$ or above and allows coating, plating or deposition, wherein the content of the glass fibers in the molded article is 25 to 50% by weight and the weight-average fiber length thereof is 0.5 to 2.0 mm, the centerline average surface roughness (Ra) over all faces to be subjected to coating, plating or deposition is 0.8 μm or below and the maximum coefficient of linear expansion at 30 to 80° C. is 5×10$^{-5}$ or below.

By selecting an alloy of a polycarbonate resin with a styrene-based resin as the resin and controlling the content and weight-average fiber length of glass fibers in a molded article, the automotive exterior resin part according to the invention is excellent in mechanical strength, heat resistance, impact resistance and low specific gravity. In particular, it is excellent in dimensional stability (low warpage) and coating properties.

BRIEF DESCRIPTION OF THE DRAWINGS

FIGS. 1A to 1C provide drawings which shows the states of evaluating the matching qualities of an article, wherein FIG. 1A is a drawing showing the state of attaching a molded article to a model automobile jig while FIG. 1B and FIG. 1C are drawings respectively showing sites for the measurement.

DETAILED DESCRIPTION OF THE PREFERRED EMBODIMENTS

Figure 1A:
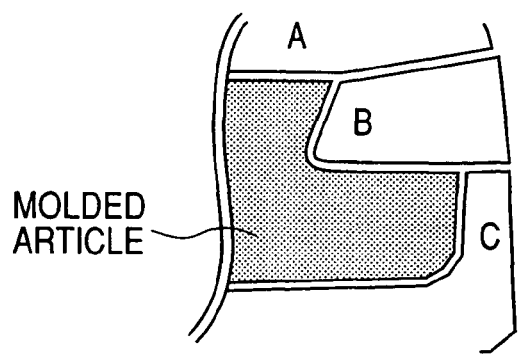

The automotive exterior resin part according to the invention is suitable for a large-sized part which frequently suffers from problems in dimensional stability. More specifically speaking, the subject thereof is a molded article having a projected area of 200 cm$^2$ or above.

The automotive exterior resin part according to the invention is a molded article made of a composition comprising glass fibers, a polycarbonate resin and a styrene-based resin as will be described hereinafter, wherein it is necessary that the content of the glass fibers in the molded article is 25 to 50% by weight and the weight-average fiber length thereof is 0.5 to 2.0 mm.

It is undesirable that the content of the glass fibers in the molded article is less than 25% by weight or the weight-average fiber length is 0.5 mm or below, since the mechanical strength typified by flexural modulus of elasticity and flexural strength and dimensional stability are lowered in such a case. On the other hand, it is also undesirable that the content of the reinforcing fibers as describe above exceeds 50% by weight or the weight-average fiber length exceeds 2.0 mm, since the molding properties are deteriorated in such a case.

It is preferable that the content of the glass fibers in the molded article is 25 to 45% by weight, more preferably 25 to 40% by weight. It is preferable that the weight-average fiber length of the glass fibers in the molded article is 0.7 to 2.0 mm, more preferably 1.0 to 1.5 mm.

To obtain excellent coating properties, it is required in the automotive exterior resin part according to the invention that the centerline average surface roughness (Ra) over all faces to be subjected to coating, plating or deposition is 0.8 μm or below, preferably 0.5 μm or below and more preferably 0.3 μm or below.

In the automotive exterior resin part according to the invention, it is also required that the maximum coefficient of linear expansion at 30 to 80° C. is 5×10$^{-5}$ or below, preferably 4×10$^{-5}$ or below and more preferably 3.5×10$^{-5}$ or below.

Furthermore, it is required that the automotive exterior resin part according to the invention is excellent in face impact resistance. When numerically expressed, it is desirable that the face impact resistance of a molded article having a thickness of 2.5 mm is 5.0 (J) or above, preferably 6.0 (J) or above and more preferably 7.0 (J) or above.

Next, the resin composition to be used in the automotive exterior resin part according to the invention will be described.

In the invention, the diameter of the glass fibers is 0.1 to 50 μm, preferably 5 to 30 μm and more preferably 7 to 20 μm. In the invention, the glass fibers contained in pellets for molding are not longer than the pellet length, though the fiber length depends on the pellet length. The average length thereof is 0.1 to 100 mm, preferably 1 to 50 mm and more preferably 3 to 30 mm.

Examples of the glass fibers include commercially available products such as E-Glass, S-Glass, C-Glass, AR-Glass, T-Glass, D-Glass and R-Glass. In the case of producing pellets of a fiber reinforced thermoplastic resin, use can be usually made of glass fibers in the form of a glass roving which is formed by coil-winding bundled multiple filaments or chopped strands which are obtained by cutting a glass roving into a desired length. Glass fibers having a diameter of 3 to 40

µm are suitable. In the case where the diameter of the glass fibers is less than 3 µm and the glass is contained in a large amount, the number of the glass fibers is relatively increased and thus the impregnation with the resin becomes difficult. In the case where the diameter of the glass fibers exceeds 40 µm, the surface appearance of the molded article is seriously deteriorated. A glass fiber diameter of 9 to 20 µm is most appropriate.

The glass fibers may be surface-treated with a surface-treating agent containing a coupling agent. As the coupling agent, it is possible to use a silane coupling agent such as amino silane, epoxy silane, amide silane, azide silane or acryl silane, a titanate-type coupling agent or a mixture of the same. Among them, amino silane and epoxy silane are preferred and an epoxy silane coupling agent is particularly preferable. Also, the kind of the binder to be used in bundling multiple filaments is not restricted. That is, use may be made of an appropriate binder such as a publicly known one.

The long glass fiber reinforced resin according to the invention can be obtained by the draw-molding method which comprises impregnating the fibers for the reinforcement with a thermoplastic resin while drawing the fibers. For example, it can be obtained by adding, if necessary, a resin additive to the thermoplastic resin, feeding the thermoplastic resin in a molten state from an extruder to a crosshead die while drawing continuous fibers through the crosshead die to thereby impregnate the continuous fibers for reinforcement with the thermoplastic resin, heating the impregnated fibers in the molten state followed by cooling and then cutting the fibers orthogonally to the drawing direction. Thus, the reinforced fibers in the same length are located in parallel in the lengthwise direction of the pellets. In addition to the above-described method which comprises feeding a resin to a crosshead die while passing a fiber bundle through the crosshead die to thereby conduct impregnation, there have been known other draw-molding methods wherein a bundle of continuous fibers for reinforcement is impregnated with a resin fundamentally under drawing. Examples of these other methods include a method which comprises passing a fiber bundle through an impregnation bath containing an emulsion, suspension or solution of a resin to thereby conduct impregnation, a method which comprises spraying a resin powder to a fiber bundle or passing a fiber bundle through a tank containing a powder to thereby adhere the resin powder to the fibers followed by melting the resin to thereby conduct impregnation and so on. Any method is usable in the invention. Although it is a common practice in these draw-molding methods to conduct the impregnation with a resin in a single stage, it may be carried out in two or more stages. It is also possible to employ different impregnation methods.

The polycarbonate resin (PC) to be used in the invention includes a polycarbonate resin as well as a polyester carbonate-based resin. A polycarbonate-based resin can be usually obtained by reacting a dihydroxy compound with phosgen (the phosgen method) or reacting a dihdyroxy compound with a carbonic acid ester such as diphenyl carbonate (the transesterification method). Although the dihydroxy compound may be an alicyclic compound, etc., a bisphenol compound is preferred.

Examples of the bisphenol compound include bis(hydroxyaryl)$C_{1-8}$alkanes such as bis(4-hydroxyphenyl)methane, 1,2,2-bis(4-hydroxyphenyl)propane (bisphenol A), 1-bis(4-hydroxyphenyl)propane, 2,2-bis(4-hydroxy-3-methylphenyl)propane, 2,2-bis(4-hydroxyphenyl)butane and 2,2-bis(4-hydroxyphenyl)hexane; bis(hydroxyaryl)$C_{4-12}$ cycloalkanes such as 1,1-bis(4-hydroxyphenyl)cyclohexane; 4,4'-dihydroxydiphenyl ether; 4,4'-dihydroxydiphenyl sulfone; 4,4'-dihydroxydiphenyl sulfide, etc. Either one of these bisphenol compounds or a combination of two or more thereof may be used.

As the polycarbonate-based resin, an aromatic polycarbonate is preferable and a bisphenol type aromatic polycarbonate (a bisphenol A type aromatic polycarbonate) is particularly preferable.

The viscosity-average molecular weight of the polycarbonate resin (PC) to be used in the invention is 13000 to 20000, preferably 14000 to 19000 and more preferably 15000 to 18000. The term "viscosity-average molecular weight" as used herein means a value that is measured by the method as will be described hereinafter in Examples.

As the styrene-based resin (SR), a resin (or a polymer) at least having an aromatic vinyl-based monomer (or a styrene-based monomer) as a polymerization component may be cited.

Examples of the aromatic vinyl-based monomer include styrene, alkylated styrenes (for example, vinyl toluene, vinyl xylene, p-ethylstyrene, p-isopropylstyrene, butylstyrene and p-t-butylstyrene), halogenated styrenes (for example, chlorostyrene and bromostyrene), α-alkylated styrenes having an alkyl substituent at the α-position (for example, α-methylstyrene) and so on. Either one of these aromatic vinyl-based monomers or a combination of two or more thereof may be used. Among these aromatic vinyl-based monomers, a styrene-based monomer such as styrene, vinyl toluene or α-methyl styrene (in particular, styrene) is usually employed.

The styrene-based resin may be a copolymer of an aromatic vinyl-based monomer with a monomer copolymerizable therewith (a copolymerizable monomer). Examples of the copolymerizable monomer (a vinyl-based monomer) include a vinyl cyanide-based monomer, an acrylic monomer, a vinyl ester-based monomer, an unsaturated polyvalent carboxylic acid or its acid anhydride, an imide-based monomer, etc. Alternatively, the vinyl-based monomer may be a vinyl halide-based monomer such as vinyl chloride. Form the viewpoint of welding properties, however, a non-halogenated monomer is preferred.

Examples of the vinyl cyanide-based monomer include (meth)acrylonitrile, a halogenated (meth)acrylonitrile, etc. Either one of these vinyl cyanide-based monomers or a combination of two or more thereof may be used. Among these vinyl cyanide-based monomers, (meth)acrylonitrile such as acrylonitrile is usually employed.

In the invention, it is preferable to use a copolymer wherein the weight ratio of an aromatic vinyl-based monomer to a vinyl cyanide-based monomer is 90/10 to 60/40, preferably 85/15 to 65/35 and more preferably 85/15 to 70/30.

In particular, a graft copolymer, which is prepared by polymerizing monomer components comprising an aromatic vinyl-based monomer and a vinyl cyanide-based monomer as the main components in the presence of a rubbery polymer, is preferred.

The weight-average molecular weight of the styrene-based resin (in a rubber-containing styrene-based resin as will be described hereinafter, the styrene-based resin as the matrix resin excluding the rubber) may be, for example, 10,000 to 1,000,000, preferably 30,000 to 500,000 and more preferably about 50,000 to about 500,000.

From the viewpoint of imparting excellent characteristics such as impact resistance to the resin composition, the styrene-based resin may be a resin containing a rubber component (a rubber-containing styrene-based resin). The rubber-containing styrene-based resin may be a polymer, wherein particles of a rubbery polymer (a rubber component) are dispersed in a matrix made of a styrene-based resin, obtained by mixing (or blending) the styrene-based resin with the rubber component (or the rubbery polymer) or copolymerizing (by graft polymerization, block polymerization, etc.) them. Usually, the rubber-containing styrene-based resin is a graft copolymer (a rubber graft styrene-based polymer) that is obtained by polymerizing at least an aromatic vinyl monomer in the presence of a rubbery polymer by a conventional method (mass polymerization, mass suspension polymerization, solution polymerization, emulsion polymerization, etc.). As will be described hereinafter, a resin obtained by mass polymerization can be appropriately used as the rubber-containing styrene-based resin in the invention.

Examples of the rubbery polymer include diene type rubbers [polybutadiene (low-cis or high-cis polybutadiene), polyisoprene, a styrene-butadiene copolymer, a styrene-isoprene copolymer, a butadiene-acrylonitrile copolymer, an isobutylene-isoprene copolymer, a styrene-isobutylene-butadiene copolymer rubber, etc.], an ethylene-vinyl acetate copolymer, acrylic rubbers (a copolymer elastomer comprising a $C_{2-8}$ alkyl ester of polyacrylic acid as the main component, etc.), ethylene-α-olefin copolymers [ethylene-propylene rubber (EPR), etc.], ethylene-α-olefin-polyene copolymers [ethylene-propylene-diene rubber (EPDM), etc.], urethane rubber, silicone rubber, butyl rubber, hydrogenated diene type rubbers (a hydrogenated styrene-butadiene copolymer, a hydrogenated butadiene polymer, etc.) and so on. In these rubbery polymers, a copolymer may be either a random or block copolymer and a block copolymer includes copolymers having an AB, ABA, tapered or radial teleblock structure. Either one of these rubbery polymers or a combination of two or more thereof may be used.

As preferable rubber components, there can be enumerated diene type rubbers such as a polymer of conjugated 1,3-butadiene or its derivative, in particular, polybutadiene (butadiene rubber), isoprene rubber and a styrene-butadiene copolymer.

In the rubber-containing styrene-based resin, the content of the rubber component is 0 to 30% by weight, preferably 5 to 25% by weight and more preferably about 10 to about 25% by weight based on the total styrene-based resin.

The rubbery polymer that is dispersed in the matrix made of the styrene-based resin may be in any form without specific restriction. That is, it may have a salami structure, a core/shell structure, an onion structure, etc.

The particle diameter of the rubbery polymer constituting the dispersion phase can be selected from, for example, a weight-average particle diameter range of 230 to 3000 nm, preferably 240 to 2000 nm and more preferably about 240 to about 1500 nm. The grafting ratio of the rubbery polymer is 5 to 150%, preferably about 10 to about 150%.

The styrene-based resin may be obtained by using a conventional method (mass polymerization, mass suspension polymerization, solution polymerization, emulsion polymerization, etc.). For example, a rubber-free styrene-based resin can be obtained by polymerizing an aromatic vinyl-based monomer (optionally together with a copolymerizable monomer such as a vinyl cyanide-based monomer or an acrylic monomer if needed) by using a conventional method (mass polymerization, suspension polymerization, mass suspension polymerization, solution polymerization, emulsion polymerization, etc.). A rubber-containing styrene-based resin can be obtained by polymerizing at least an aromatic vinyl-based monomer in the presence of a rubbery polymer by using a conventional method (mass polymerization, mass suspension polymerization, solution polymerization, emulsion polymerization, etc.).

Typical examples of the styrene-based resin include styrene-based resins containing no rubber component (rubber-free styrene-based resins) [for example, polystyrene (GPPS), a copolymer comprising an aromatic vinyl-based monomer with a vinyl cyanide-based monomer and/or an acrylic monomer [for example, a styrene-acrylonitrile copolymer (an AS resin), a styrene-methyl methacrylate copolymer (an MS resin), an acrylonitrile-styrene-methyl methacrylate copolymer, etc.], copolymers of an aromatic vinyl-based monomer with an unsaturated carboxylic acid anhydride [for example, a styrene-maleic anhydride copolymer (an SMA resin), etc.], etc.]] and rubber-containing styrene-based resins [for example, high impact polystyrene (HIPS), methyl methacrylate-denatured HIPS (transparent HIPS), a styrene-acrylonitrile-butadiene copolymer (an ABS resin), a methyl methacrylate-denatured ABS resin (a transparent ABS resin), an α-methyl styrene-denatured ABS resin, an imide-denatured ABS resin, a styrene-methyl methacrylate-butadiene copolymer (an MBS resin), an AXS resin, a methyl methacryalte-denatured AXS resin, etc.]. The term "AXS resin" as described above means a resin wherein a rubber component X (acrylic rubber, polyethylene chloride, ethylene-propylene rubber, an ethylene-vinyl acetate copolymer, etc.) has been graft-polymerized with acrylonitrile A and styrene S. Specific examples thereof include an acrylonitrile-acrylic rubber-styrene-based resin (an AAS resin), an acrylonitrile-ethylene/propylene rubber-styrene-based resin (an AES resin), etc.

Among these styrene-based resins, it is preferable to use high impact polystyrene, a styrene-based resin having an acrylic monomer and/or a vinyl cyanide-based monomer as the polymerization components (or the copolymerization components) [for example, a styrene-based resin having no rubber component, e.g., a styrene-based resin comprising an acrylic monomer unit and/or a vinyl cyanide-based monomer unit as the constitutional units, e.g., a copolymer of an aromatic vinyl-based monomer with a vinyl cyanide-based monomer and/or an acrylic monomer (for example, a copolymer of a styrene-based monomer with a vinyl cyanide-based monomer such as an AS resin), a rubber-containing (rubber-grafted) styrene-based resin having an acrylic monomer and/or a vinyl cyanide-based monomer as the polymerization components (a copolymer wherein a rubber component has been graft-polymerized with an acrylic monomer and/or a vinyl cyanide-based monomer and a styrene-based monomer such as an ABS resin, an AAS resin, an AES resin, an MBS resin, a methacrylic acid-denatured ABS resin, etc.) and so on].

Either one of these styrene-based resins or a combination of two or more thereof may be used.

In the invention, it is also possible to use a thermoplastic resin other than the polycarbonate resin and the styrene-based resin. Examples of such another thermoplastic resin include polyester-based resins (polybutylene terephthalate, polyethylene terephthalate, etc.), polyamide-based resins (aliphatic polyamide-based resins such as Polyamide 5, Polyamide 6, Polyamide 66, Polyamide 610, Polyamide 11, Polyamide 12, Polyamide 612, Polyamide 6/66 and Polyamide 6/11; aromatic polyamide-based resins such as Polyamide 6T, Polyamide 9T and Polyamide MXD; alicyclic polyamide-based resins, etc.), polyurethane-based resins, olefin-based resins [olefin homopolymers and copolymers (including elastomers) such as polyethylene (including low density polyethylene, high density polyethylene, etc.), polypropylene, an ethylene-propylene copolymer and ethylene-propylene rubber, cyclic olefin-based resins, etc.], acrylic resins, vinyl-based resins (for example, a vinyl chloride-based resin, a vinyl acetate-based resin, an ethylene-vinyl acetate copolymer, polyvinyl alcohol, an ethylene-vinyl alcohol copolymer, etc.), thermoplastic elastomers (for example, a polyester-based thermoplastic elastomer, etc.) and so on. These thermoplastic resins may be either crystalline resins or amorphous resins. Either one of these thermoplastic resins or a combination of two or more thereof may be used.

So long as the resin characteristics are not deteriorated, the resin composition according to the invention may contain additives commonly employed, for example, a compatibilizing agent, a plasticizer, a flame retardant aid (for example, a fluorinated resin such as polytetrafluoroethylene), a dye, a stabilizer (for example, an antioxidant, a photo stabilizer or a heat stabilizer), a lubricant, a dispersing agent, a foaming agent, an antibacterial agent and so on. Either one of these additives or a combination of two or more thereof may be used.

In the molding, it is preferred to maintain the length of fibers contained in pellets as long as possible. For this purpose, a commonly employed molding method and molding device are not highly advantageous, though usable, since there is a high risk that a large shear caused by the rotation of a screw would break the fibers in the course of plasticizing the material. Therefore, it is preferable to employ a molding machine provided with a plasticizing system having been developed for long fiber reinforced plastic resins by a manufacturer of molding machines. As molding conditions for maintaining the desired fiber length, it is preferable to reduce the shear due to plasticization by, for example, employing plasticization temperature higher by 10 to 30° C. than the plasticization temperature commonly employed for molding a matrix resin free from reinforcing fibers (i.e., a non-reinforced resin). In designing a mold and/or a die, it is preferable from the viewpoint of maintaining the desired fiber length to maximize the sectional area of a resin channel and minimize the pressure loss by checking the shape of the resin channel, though the invention is not restricted thereto.

By employing such conditions for maintaining the desired fiber length as discussed above in the molding step, it becomes possible to obtain a molded article of a long glass fiber reinforced resin wherein the weight-average fiber length of the reinforcing fibers dispersed in the molded article made from the long glass fiber reinforced resin is 0.5 mm to 2 mm. Concerning the ratio of the polycarbonate resin (PC) and the styrene-based resin (SR) with which the reinforcing fibers are impregnated, the weight ratio PC/SR is usually 90/10 to 50/50, preferably 90/10 to 60/40 and particularly preferably 80/20 to 60/40. In the case where the PC/SR ratio exceeds 90/10 (i.e., the polycarbonate resin is used in excess), the flowability of the resin is lowered and, in its turn, the molding processability is deteriorated. In the case where the PC/SR ratio is less than 50/50 (i.e., PC is used in a very small amount), the heat resistance is lowered and the strength inherent to PC cannot be exhibited. Concerning the content of the reinforcing fibers in the long glass fiber reinforced resin, the reinforcing fibers are contained usually in an amount of 11 to 200 parts by weight, preferably 25 to 150 parts by weight and particularly preferably 30 to 100 parts by weight, per 100 parts by weight of the pellets. In the case where the content of the reinforcing fibers is less than 11 parts by weight, the mechanical strength of the molded article is lowered. In the case where the content of the reinforcing fibers exceeds 200 parts by weight, the impregnation with the resin cannot be sufficiently carried out in the drawing method and fuzz formation by the fibers in the pellet becomes serious, which makes the production difficult.

EXAMPLES

Next, the invention will be described in greater detail by referring to the following Examples, though it is to be understood that the invention is not restricted to these Examples. The materials, methods for measuring physical properties and the injection molding device employed in Examples and Comparative Examples are as follows.

[Materials Employed]

PC: viscosity-average molecular weight (Mv)=17800.

ABS: rubber content 20%, copolymerization ratio of monomers constituting matrix: styrene/acrylonitrile=82/18 (by weight), rubber weight-average particle diameter 1000 nm.

PP: melt flow rate=60 g/10 min (homopolypropylene).

Glass fiber roving: fiber diameter 17 μm, treated with epoxy silane coupling agent.

Short glass fiber (chopped strand): fiber diameter 13 μm, fiber length 3 mm, treated with epoxy silane coupling agent.

[Measurement of Physical Properties]

Viscosity-average molecular weight (Mv): Measurement was made by measuring the intrinsic viscosity [η] of the polymer in the form of a methylene chloride solution at 20° C. with an Ubbelohde's viscometer and calculating the viscosity-average molecular weight (Mv) according to the following equation:

$$[\eta]=1.23\times10^{-5} (Mv)^{0.83}$$

Melt flow rate: determined based on ISO1133 (230° C., 2.16 kg).

Fiber content: A test piece was cut out at random from an arbitrary position of a molded article and the fiber content was measured.

Method of measuring fiber length (weight-average fiber length): A sample weighing about 5 g was cut out at random from an arbitrary position of a molded article and ashed at 650° C. Next, fibers were taken out therefrom and the weight-average fiber length was determined from a portion of the fibers (about 500 strands).

Coefficient of linear expansion: Measurement was made by cutting out a test piece (10 mm×20 mm) at random from an arbitrary position of a molded article having a thickness of 2.5 mm or above and the maximum (n=10) was indicated.

Centerline average surface roughness (Ra): Measurement was made by selecting five positions at random from arbitrary positions in the faces of a molded article to be subjected to coating, plating or deposition and the average of the measured values was indicated.

Face impact resistance: Measurement was made by cutting out a test piece (100 mm×100 mm×2.5 mm) at random from an arbitrary position of a molded article having a thickness of 2.5 mm.

Figure 1B:
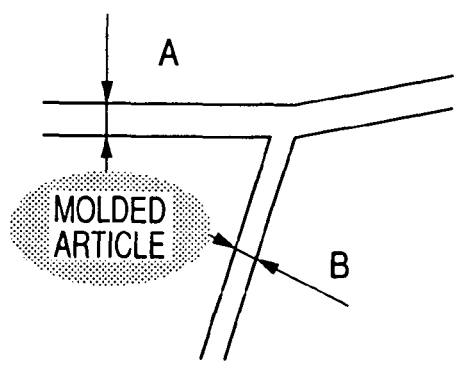
Figure 1C:
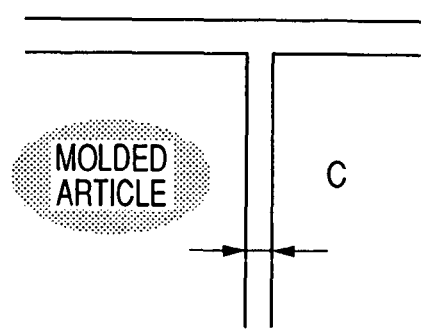

Matching qualities of article: As FIG. 1A shows, a molded article was attached to a model automobile jig and allowed to stand in this state in an atmosphere under heating (80° C.) and cooling (−30° C.). Next, the sites A and B (FIG. 1B) and C (FIG. 1C) with a need for matching qualities were evaluated in gap, misalignment and bump in the following three grades.

A: within a range of 1.0 mm above or below a preset value.
B: within a range of 1.0 mm to 2.0 mm above or 1.0 mm to 2.0 mm below the preset value.
C: exceeding 2.0 mm above or below the preset value.

Coating properties: Coating was made by using a coating material commonly employed for automotive exterior panels and the surface was evaluated in the following three ranks.

(Coating Conditions)
Base (15 μm)→Flash (1 min)→Clear (25 μm)→Setting (10 min)→Drying (80° C., 30 min).

A: no orange peel is observed in the coated face.
B: orange peel is observed in a part of the coated face.
C: orange peel is observed in the whole coated face.

Misalignment caused by cooling/heating cycle: The same test piece as employed in evaluating the matching qualities of article was subjected repeatedly to heating (80° C.) and cooling (−30° C.). Then, changes in gap, misalignment and bump of the tested molded article at room temperature, compared with the initial values, were evaluated in the following three ranks.

A: 1.0 mm or below.
B: 1.0 to 2.0 mm.
C: 2.0 mm or above.

Falling ball impact strength at low temperature: By using the same test piece as employed in evaluating the matching qualities of article, a falling weight was fallen from such a height as causing the breakage. Then, the height causing the breakage was evaluated in the following three ranks.

A: 1.5 Nm or above.
B: 1.0 to 1.5 Nm.
C: 1.0 Nm or below.

Specific gravity: The specific gravity before coating was evaluated in the following three ranks.

A: 1.5 or below.
B: 1.5 to 1.6.
C: 1.6 or above.

[Injection Molding]
Device: J1300SSII manufactured by The Japan Steel Works, Ltd.
Molding temperature (cylinder temperature): 280° C.
Die temperature: 120° C.
Molded article: luggage garnish type Example 1

While drawing a glass fiber roving through a crosshead die having a wave-shaped channel for continuous fibers, a mixture comprising 70 parts by weight of PC and 30 parts by weight of ABS, which was employed as a thermoplastic resin, was fed in a molten state (280° C.) from an extruder connected to the crosshead. After impregnating glass fibers, the resin was drawn as strands through a shaping die, cooled and cut to give pellets of 11 mm in length containing 32% by weight of the glass fibers. The obtained pellets were subjected to injection molding to thereby produce a molded article having the characteristics as listed in Table 1. The molded article thus obtained is excellent in matching qualities, coating properties, misalignment caused by cooling/heating cycle and falling ball impact strength at low temperature and has a low specific gravity.

Example 2

While drawing a glass fiber roving through a crosshead die having a wave-shaped channel for continuous fibers, a mixture comprising 70 parts by weight of PC and 30 parts by weight of ABS, which was employed as a thermoplastic resin, was fed in a molten state (280° C.) from an extruder connected to the crosshead. After impregnating glass fibers, the resin was drawn as strands through a shaping die, cooled and cut to give pellets of 11 mm in length containing 40% by weight of the glass fibers. The obtained pellets were subjected to injection molding to thereby produce a molded article having the characteristics as listed in Table 1. The molded article thus obtained is excellent in matching qualities, coating properties, misalignment caused by cooling/heating cycle and falling ball impact strength at low temperature and has a low specific gravity.

Comparative Example 1

Without impregnating fibers with a resin by using a crosshead, 70 parts by weight of a mixture comprising 70 parts by weight of PC and 30 parts by weight of ABS, which was employed as a thermoplastic resin, was mixed with 30 parts by weight of short glass fibers (chopped strands) in a tumbler blender and kneaded in a molten state with the use of an extruder to give a pellet type resin composition. The obtained pellets were subjected to injection molding to thereby produce the same molded article as in Examples. Although the molded article thus obtained is excellent in coating properties and has a low specific gravity, it is inferior in matching qualities, misalignment caused by cooling/heating cycle and falling ball impact strength at low temperature.

Comparative Example 2

While drawing a glass fiber roving through a crosshead die having a wave-shaped channel for continuous fibers, a mixture comprising 30 parts by weight of PC and 70 parts by weight of ABS, which was employed as a thermoplastic resin, was fed in a molten state (280° C.) from an extruder connected to the crosshead. After impregnating glass fibers, the resin was drawn as strands through a shaping die, cooled and cut to give pellets of 11 mm in length containing 40% by weight of the glass fibers. The obtained pellets were subjected to injection molding to thereby produce a molded article having the characteristics as listed in Table 1. Although the molded article thus obtained is excellent in matching qualities, coating properties and falling ball impact strength at low temperature and has a low specific gravity, it is inferior in misalignment caused by cooling/heating cycle.

Comparative Example 3

While drawing a glass fiber roving through a crosshead die having a wave-shaped channel for continuous fibers, a mixture comprising 70 parts by weight of PC and 30 parts by weight of ABS, which was employed as a thermoplastic resin, was fed in a molten state (280° C.) from an extruder connected to the crosshead. After impregnating glass fibers, the resin was drawn as strands through a shaping die, cooled and cut to give pellets of 11 mm in length containing 60% by weight of the glass fibers. The obtained pellets were subjected to injection molding to thereby produce a molded article having the characteristics as listed in Table 1. Although the molded article thus obtained is excellent in matching qualities, misalignment caused by cooling/heating cycle and falling ball impact strength at low temperature, it has a high specific gravity and is inferior in coating properties.

Comparative Example 4

While drawing a glass fiber roving through a crosshead die having a wave-shaped channel for continuous fibers, PP, which was employed as a thermoplastic resin, was fed in a molten state (280° C.) from an extruder connected to the crosshead. After impregnating glass fibers, the resin was drawn as strands through a shaping die, cooled and cut to give pellets of 11 mm in length containing 40% by weight of the glass fibers. The obtained pellets were subjected to injection molding to thereby produce a molded article having the characteristics as listed in Table 1. Although the molded article thus obtained is excellent in falling ball impact strength at low temperature and has a low specific gravity, it is inferior in matching qualities, misalignment caused by cooling/heating cycle and coating properties.

TABLE 1

|  |  | Ex. 1 | Ex. 2 | Comp. Ex. 1 | Comp. Ex. 2 | Comp. Ex. 3 | Comp. Ex. 4 |
|---|---|---|---|---|---|---|---|
| Resin composition | — | PC/ABS | PC/ABS | PC/ABS | PC/ABS | PC/ABS | PP |
| PC/ABS ratio | — | 70/30 | 70/30 | 70/30 | 30/70 | 70/30 | — |
| Fiber content | wt. % | 32 | 40 | 40 | 40 | 60 | 40 |
| Weight-average fiber length | mm | 1.2 | 1.2 | 0.3 | 1.3 | 0.8 | 1.2 |
| Coefficient of linear expansion | ×10$^{-5}$(1/K) | 3.5 | 3.0 | 4.0 | 5.5 | 3.0 | 7.0 |
| Centerline average roughness (Ra) | μm | 0.2 | 0.3 | 0.3 | 0.3 | 0.6 | 0.2 |
| Face impact resistance | J | 8 | 7 | 3 | 8 | 9 | 10 |
| Matching qualities of article | — | A | A | C | A | A | C |
| Coating properties | — | A | A | A | A | C | C |
| Misalignment caused by cooling/heating cycle | — | A | A | C | C | A | C |
| Falling ball impact strength at low temp. | — | A | A | C | A | A | A |
| Specific gravity | — | A | A | A | A | C | A |

What is claimed is:

1. An automotive exterior resin part which is a molded article made of a long glass fiber reinforced polycarbonate resin/ABS resin mixture molded by injection molding that has a projected area of 200 cm$^2$ or above and allows coating, plating or deposition thereupon the resin part, wherein a content of the glass fibers in the molded article is 25 to 50% by weight and a weight-average fiber length thereof is 1.0 to 1.5 mm, wherein the resin part comprises faces, and a centerline average surface roughness (Ra) of each of the faces of the resin part to be subjected to coating, plating or deposition is 0.8 μm or below and a maximum coefficient of linear expansion of the resin part at 30 to 80° C. is 5×10$^{-5}$ (1/K) or below.

2. An automotive exterior resin part as claimed in claim 1, wherein a face impact resistance of the molded article having a thickness of 2.5 mm is 5.0 (J) or above.

3. An automotive exterior resin part as claimed in claim 1, wherein a weight ratio of the polycarbonate resin to the ABS resin in the long glass fiber reinforced polycarbonate resin/ABS resin is 90/10 to 50/50.

4. An automotive exterior resin part as claimed in claim 1, wherein the glass fibers have been surface-treated with an epoxy silane coupling agent.

5. An automotive exterior resin part as claimed in claim 1, wherein the content of the glass fibers in the molded article is 25 to 45% by weight.

6. An automotive exterior resin part as claimed in claim 1, wherein the centerline average surface roughness (Ra) of each of the faces of the resin part to be subjected to coating, plating or deposition is 0.5 μm or below.

7. An automotive exterior resin part as claimed in claim 1, wherein the maximum coefficient of linear expansion at 30 to 80° C. is 4×10$^{-5}$ (1/K) or below.

8. An automotive exterior resin part as claimed in claim 1, wherein a face impact resistance of the molded article having a thickness of 2.5 mm is 6.0 (J) or above.

9. An automotive exterior resin part as claimed in claim 1, wherein the automotive exterior resin part is a rear garnish, a radiator grill, a luggage garnish, a back panel, a side panel, a spoiler, a roof, a pillar outer, a hood or a wheel cover.

* * * * *